United States Patent
Sierakowski et al.

(10) Patent No.: US 7,059,647 B1
(45) Date of Patent: Jun. 13, 2006

(54) VEHICLE BED LINER

(75) Inventors: Thomas G. Sierakowski, Metamora, MI (US); Eric R. Papa, Knoxville, TN (US); John C. Montagna, Metamora, MI (US)

(73) Assignee: Durakon Acquisition Corp., Lapeer, MI (US)

( * ) Notice: Subject to any disclaimer, the term of this patent is extended or adjusted under 35 U.S.C. 154(b) by 0 days.

(21) Appl. No.: 10/743,937

(22) Filed: Dec. 23, 2003

Related U.S. Application Data

(60) Provisional application No. 60/437,419, filed on Dec. 31, 2002.

(51) Int. Cl.
*B60R 13/01* (2006.01)

(52) U.S. Cl. ............... 296/39.1; 296/39.2; 296/37.6

(58) Field of Classification Search ............... 296/39.1, 296/39.2, 183.1, 184.1, 203.04, 37.6, 97.23; D12/93, 98, 221, 414.1
See application file for complete search history.

(56) References Cited

U.S. PATENT DOCUMENTS

| | | | | |
|---|---|---|---|---|
| 4,047,749 A | | 9/1977 | Lambitz et al. ............ 296/39.1 |
| 4,128,271 A | * | 12/1978 | Gray ........................ 296/39.2 |
| 4,341,412 A | * | 7/1982 | Wayne ..................... 296/39.2 |
| D271,009 S | | 10/1983 | Fishler ........................ D12/98 |
| 4,428,306 A | | 1/1984 | Dresen et al. ............. 108/53.3 |
| 4,592,583 A | | 6/1986 | Dresen et al. ............. 296/39.1 |
| 4,681,360 A | | 7/1987 | Peters et al. ............... 296/37.6 |
| 4,693,507 A | | 9/1987 | Dresen et al. ............. 296/39.1 |
| 4,750,776 A | * | 6/1988 | Barben ..................... 296/39.2 |
| 4,767,149 A | | 8/1988 | Rye ........................... 296/39.1 |
| 4,768,822 A | | 9/1988 | Gower ...................... 296/39.1 |
| D298,112 S | | 10/1988 | Hall ........................... D12/98 |
| 4,824,158 A | | 4/1989 | Peters et al. ............... 296/37.6 |
| 4,958,876 A | | 9/1990 | Diaco et al. ............... 296/39.2 |
| 4,991,899 A | | 2/1991 | Scott ......................... 296/39.2 |
| 5,167,434 A | | 12/1992 | Bott .......................... 296/39.2 |
| D333,112 S | | 2/1993 | Diaco et al. ................ D12/98 |
| 5,185,980 A | * | 2/1993 | Rydberg et al. .......... 52/506.09 |
| D413,854 S | | 9/1999 | Vitoorapakorn ............ D12/221 |
| D417,182 S | | 11/1999 | Vitoorapakorn ............ D12/221 |
| 6,129,402 A | * | 10/2000 | Carriere .................... 296/39.1 |
| 6,203,090 B1 | * | 3/2001 | Vitoorapakorn ............ 296/39.2 |
| D452,472 S | | 12/2001 | Darbishire ................. D12/221 |

(Continued)

FOREIGN PATENT DOCUMENTS

CA  1330572  7/1994

OTHER PUBLICATIONS

Sierakowski et al., U.S. Appl. No. 29/173,488, filed Dec. 30, 2002 A.D.

(Continued)

*Primary Examiner*—D. Glenn Dayoan
*Assistant Examiner*—Greg Blankenship
(74) *Attorney, Agent, or Firm*—Christopher John Rudy

(57) ABSTRACT

Liner for a bed of a vehicle includes a member having a substantially flat portion with ribs that, in one embodiment, in a first part are arranged in an array extending along a front to rear axis, and in a second part have at least one array extending obliquely to the array of the first part. In another embodiment, ribs are arrayed such that in cross section a bank of the ribs includes at leant one outer rib member part that spans obliquely from a substantially flat part of the liner into an upper member of a rib that it in part forms.

20 Claims, 2 Drawing Sheets

U.S. PATENT DOCUMENTS 6,328,364 B1 * 12/2001 Darbishire ............... 296/26.09
D458,209 S        6/2002 Darbishire ................ D12/221
6,692,054 B1 *  2/2004 Vitoorapakorn ............ 296/39.2
D488,764 S       4/2004 Sierakowski et al.

OTHER PUBLICATIONS

Sierakowski et al., U.S. Appl. No. 60/437,419, filed Dec. 31, 2002 A.D.

* cited by examiner

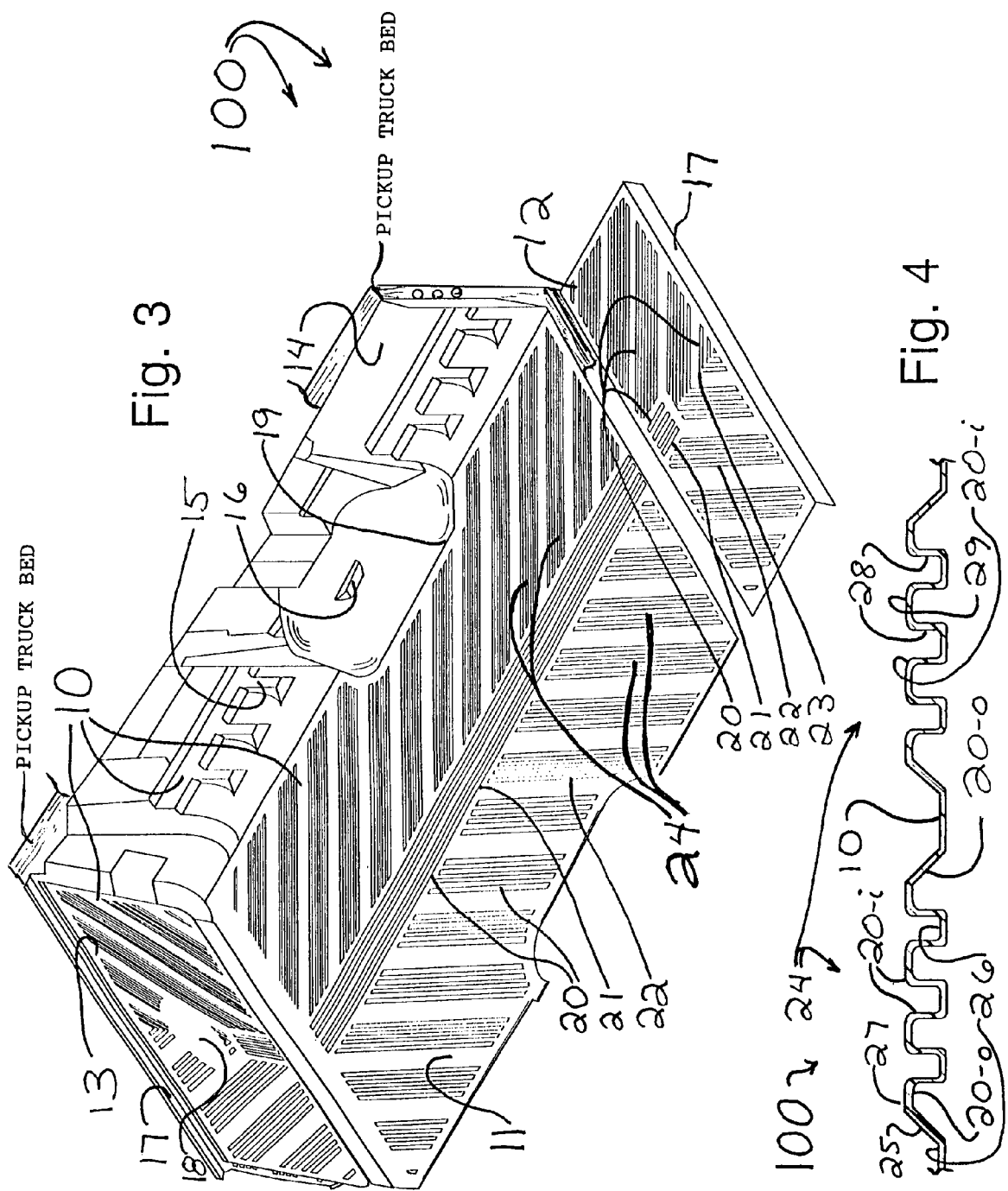

VEHICLE BED LINER

This claims benefit under 35 USC 119(e) of provisional patent application No. 60/437,419 filed on Dec. 31, 2002 A.D., the whole specification of which is incorporated herein by reference.

FIELD OF THE INVENTION

The present invention concerns a liner for a bed of a vehicle such an a pickup truck, van, sport utility vehicle, or trailer. Ribs are arrayed in a pattern with the liner.

BACKGROUND TO THE INVENTION

Vehicle bed liners, in general, are well known accessories for the beds of pickup trucks, which are immovably secured in the cargo area of the pickup to protect the bed from dents, chips in the paint, and so forth, and enhance the appeal of the pickup. Constant concerns in the art include the placement and removal of cargo to and from a vehicle cargo area having a bed liner installed, and the strength and durability of the liner.

It would be desirable to improve upon the prior art.

DISCLOSURE OF THE INVENTION

The present invention provides a liner for a bed of a vehicle which comprises a member having a substantially flat portion with ribs that, in one embodiment, in a first part are arranged in an array extending along a front to rear axis, and in a second part have at least one array extending obliquely to the array of the first part. In another embodiment, ribs are arrayed such that in cross section a bank of the ribs includes at least on outer rib member part that spans obliquely from a substantially flat part of the liner into an upper member of a rib that it in part forms.

The invention is useful in vehicle aesthetics and in cargo management. By the invention with its rib patterns, not only can the appeal of a vehicle such as a pickup truck, sport utility vehicle, van, or even a trailer be enhanced, but so can be the placement and removal of cargo to and from a vehicle cargo area; and the strength and/or durability of the liner can be increased. These things can be accomplished economically as well, with there being generally no increase in costs involved in producing the present invention compared to corresponding bed liners of the prior art. Numerous further advantages attend the invention.

The drawings form part of the specification hereof. With respect to the drawings, the following is briefly noted:

FIG. 3 is a perspective view of the liner of FIG. 1, attached to the cargo bed of a pickup truck, looking from the top, left, rear, with the left side not depicted for the sake of clarity.

FIG. 4 is a sectional view of the liner of FIG. 1, taken along 4—4.

The invention can be further understood by the following detail, which may be read in view of the drawings. Such is to be taken in an illustrative and not necessarily limiting sense.

In general, the bed liner of the invention includes a member having a substantially flat portion with ribs. Preferably, the flat portion includes a bottom, which may be the bottom of the bed liner for covering the bottom of a cargo area and/or an inside surface of a tailgate. The ribs can be arranged in a first part in an array extending along a front to rear axis, and in a second part have at least one array extending obliquely to the array of the first part. Preferably, the array of the first part is in a central area, taken from one side to an opposing second side of the liner bottom, and as the second part there are two arrays with the obliquely extending ribs, one on each side of the central area. These two arrays of the second part may form a mirror image of one another with respect to the array in the central area. The ribs can be arrayed such that in cross section a bank of the ribs includes at least one outer rib member part that spans obliquely from a trough part of the liner into a crest member of a rib that it in part forms. Preferably, there are two such obliquely spanning rib member parts, more preferably on opposing outsides of two separate ribs in the bank, and most preferably with at least one intervening rib between the opposing obliquely spanning ribs. Desirably, the intervening rib(s) does(do) have side support member parts connected substantially normal to a horizontally extending crest member of the rib(s), each intervening rib, for example, approximating an invert d, substantially squared-off letter "U" (without a tail) in cross-section. The bed liner of the invention may be made to cover the entire cargo area of the vehicle or part(s) thereof.

Any suitable material may be employed in making the vehicle bed liner of the invention. Plastics, especially thermoforming plastics, which can be polyolefins, for instance, polyethylene, polypropylene and/or polybutylene, are advantageously employed.

Any suitable method may be employed to make the vehicle bed liner of the invention. Molding, especially vacuum molding with an enhanced cooling cycle, for example, industrial scale vacuum molding of polypropylene, say, containing carbon black and having any suitable adjuvant(s) such as plasticizer(s), anti-oxidant(s), other anti-static agent(s), reinforcing fiber(s), and so forth, are advantageously employed. A mold-release agent may be used.

The finished vehicle bed liner of the invention can be installed by known methods such as by bolts, clips, glue, rivets, screws and so forth. Thus, when in the form of a bed liner, the invention can immovably secured to the cargo area of the vehicle.

Figure 1:
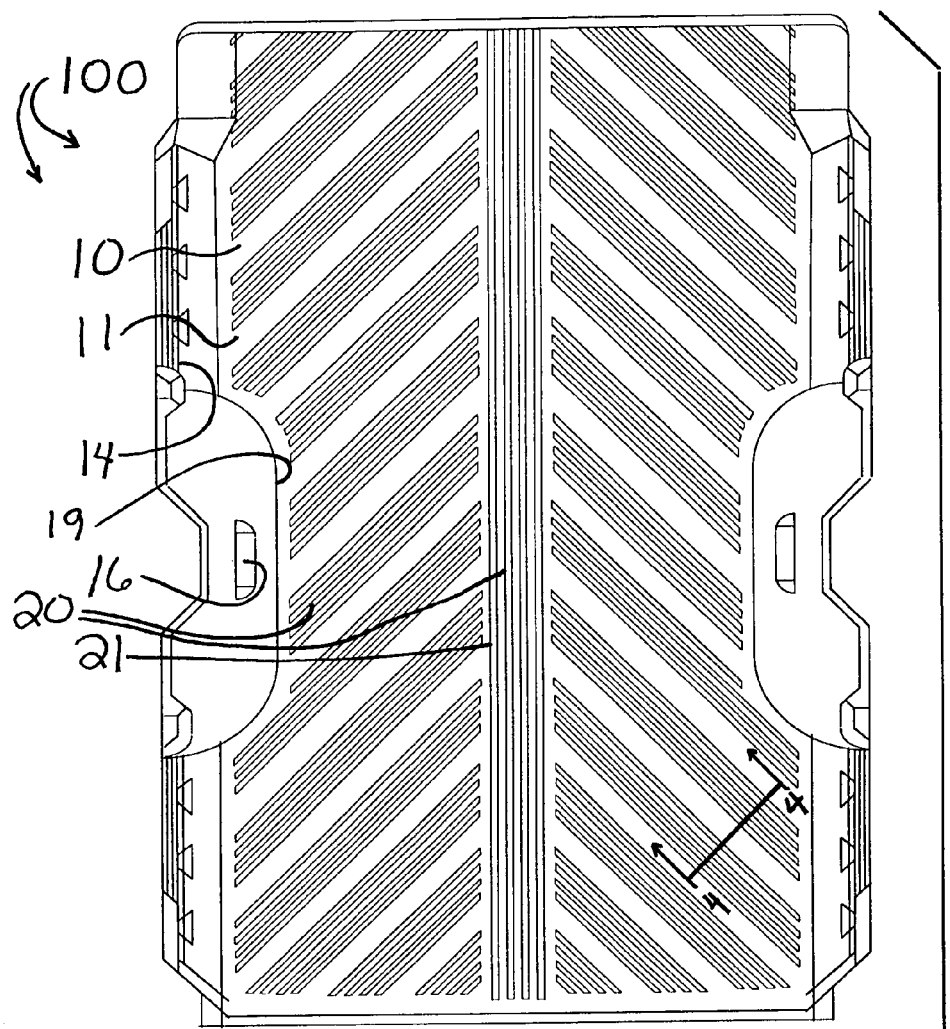
FIG. 1 is a top view of a vehicle bed liner, especially adapted for installation in the cargo bed and on the tailgate of a pickup truck as the vehicle.
Figure 2:
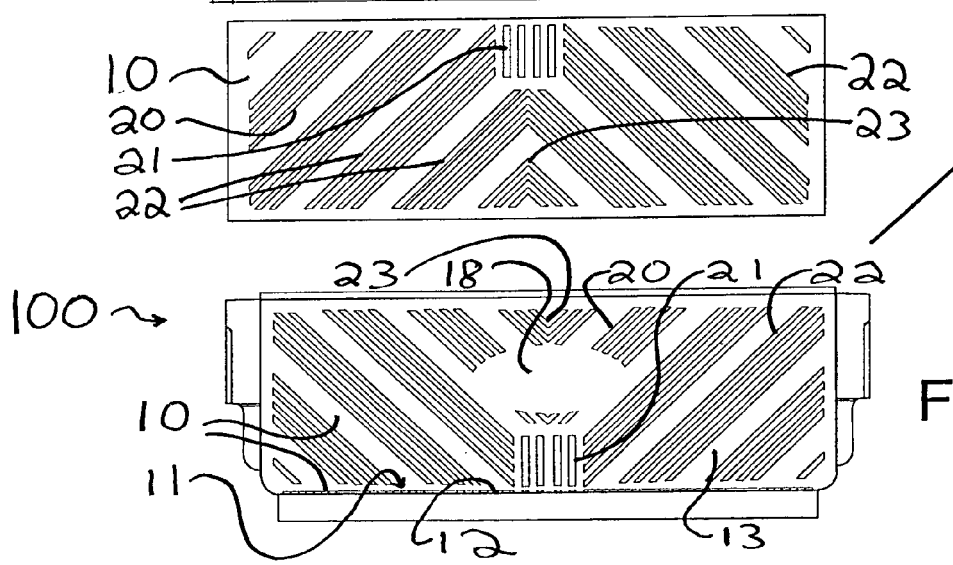
FIG. 2 is an elevational view of the liner of FIG. 1, looking from the tailgate (rear) end to the cab (front) end.

With respect to the drawings, vehicle bed liner 100 includes substantially flat portion 10 having ribs 20. See, FIGS. 1–4.

The substantially flat portion 10 may serve as bottom 11, tailgate inside surface 12, front wall 13, or side wall 14 (not illustrated with ribs). Other features than the ribs 20 such as side wall channel 15, installation recess 16, ledge 17, logo area 18, wheel well boundary 19, and so forth may be present.

The ribs 20 can be arranged in first part 21 in an array extending along a front to rear axis, and in second part 22 have at least one array extending obliquely to the array 21. Other arrangements are possible, for example, with there being locus 23 where no rib extends along the front to rear axis but where two sets of corresponding obliquely extending rib parts 22 meet.

The ribs 20 can be arrayed such that in cross section bank 24 of the ribs 20 includes outer rib 20-$o$ with outer rib member part 25 that spans obliquely from trough part 26 into crest member 27 of the rib 20-$o$ that it in part forms, and intervening rib(s) 20-$i$ can be between a pair of opposing obliquely spanning ribs 20-$o$. (Such an arrangement may be employed also in a pull out drawer system tray.) The intervening or otherwise any bed liner rib(s) 20-*i*, 20 may have side support member parts 28 connected substantially normal to horizontally extending crest member 29.

Sierakowski et al., U.S. patent application Ser. No. 29/173,488 filed on Dec. 30, 2002 A.D., is incorporated herein by reference. That application issued as patent U.S. D488,764 S (Apr. 20, 2004).

The present invention is thus provided. Various features, parts, subcombinations and combinations, or lack whereof, can be employed with or without reference to other features, parts, subcombinations or combinations in the practice of the invention, and numerous adaptations and modifications can be effected in its spirit, the literal claim scope of which is particularly pointed out as follows:

What is claimed is:

1. A liner for a bed of a vehicle, which comprises a member having a substantially flat portion with an outer boundary that defines sides and with ribs that in a first part are arranged in a central area in an array extending along an axis, and in a second part have two arrays with the ribs extending obliquely with respect to the array of the first part and the axis, one of these two obliquely extending arrays on each side of the central area, with at least some of the ribs of the two obliquely extending arrays extending substantially to a portion of the outer boundary that is different from that to which the ribs of the array of the first part extend, wherein at least some of the obliquely extending ribs are arrayed in a plurality of banks, each bank having a plurality of ribs such that in cross section each such bank of the obliquely extending ribs includes two outer ribs, each outer rib of the bank having an outer portion that spans obliquely from a trough part of the liner into a crest member of the outer rib that it in part forms, and each outer rib of the bank having an inner portion that spans substantially upright from the trough part of the liner into the crest member of the outer rib that it in part forms, such that the obliquely spanning outer rib portions of the two outer ribs are on opposing outsides of the bank.

2. The liner of claim 1, wherein the substantially flat portion is a bottom for the liner in which:

the array of ribs in the first part goes from a front side of the liner bottom to an opposing rear side of the liner bottom, substantially to each respective boundary; and as to the second part, the two arrays with the obliquely extending ribs form a mirror image of one another with respect to the array of the ribs in the first part in the central area and a majority of the ribs in the arrays of the second part extend to side sides of the liner bottom.

3. The liner of claim 2, wherein the substantially flat portion further comprises at least one of:

a front wall of the liner that is attached to the liner bottom, which wall has an array of ribs arranged in a first part in a central area in an array extending along a front wall axis, and two arrays of ribs arranged in a second part extending obliquely with respect to the array of the first part and the front wall axis, and a tailgate inside surface having an array of ribs arranged in a first part in a central area in an array extending along a tailgate axis, and two arrays of ribs arranged in a second part extending obliquely with respect to the array of the first part and the tailgate axis;

wherein:

the array of ribs in the first part of the at least one of the front wall and the tailgate inside surface extends to the boundary on a side adjacent the liner bottom so that these ribs of the at least one of the front wall and the tailgate inside surface line up with the array of ribs in the first part of the liner bottom; and the two arrays of the second part of the at least one of the front wall and the tailgate inside surface form a mirror image of one another with respect to the array of the ribs in the first part in the central area of the at least one of the front wall and the tailgate inside surface.

4. The liner of claim 1, wherein the two outer ribs of the bank have at least one intervening rib between them, the at least one intervening rib having opposing rib portions that span substantially upright from the trough part of the liner into the crest member thereof.

5. The liner of claim 2, wherein the two outer ribs of the bank have at least one intervening rib between them, the at least one intervening rib having opposing rib portions that span substantially upright from the trough part of the liner into the crest member thereof.

6. The liner of claim 3, wherein the two outer ribs of the bank have at least one intervening rib between them, the at least one intervening rib having opposing rib portions that span substantially upright from the trough part of the liner into the crest member thereof.

7. A liner for a bed of a vehicle, which comprises a member having a substantially flat portion with ribs that are arrayed in a plurality of banks, each bank having a plurality of ribs such that in cross section each such bank of the ribs includes two outer ribs, each outer rib of the bank having an outer portion that spans obliquely from a trough part of the liner into a crest member of the outer rib that it in part forms, and each outer rib of the bank having an inner portion that spans substantially upright from the trough part of the liner into the crest member of the outer rib that it in part forms, such that the obliquely spanning outer rib portions of the two outer ribs are on opposing outsides of the bank.

8. The liner of claim 7, wherein the two outer ribs of the bank have at least one intervening rib between them, the at least one intervening rib having opposing rib portions that span substantially upright from the trough part of the liner into the crest member thereof.

9. A liner for a bed of a vehicle, which comprises a plastic vehicle bed liner with a member having a substantially flat portion with an outer boundary that defines sides and with ribs that consist essentially of three arrays per substantially flat portion, which arrays:

in a first part are arranged in a central area in an array extending along an axis, and in a second part are arranged in two opposing arrays, each with the ribs extending obliquely with respect to the array of the first part and the axis, one of these two obliquely extending arrays on each side of the central area, with the ribs of the two obliquely extending arrays extending substantially to the outer boundary;

wherein at least some of the obliquely extending ribs are arrayed in a plurality of banks, each such bank having a plurality of ribs such that in cross section the bank of the obliquely extending ribs includes two outer ribs, each outer rib of the bank having an outer portion that spans obliquely from a trough part of the liner into a crest member of the outer rib that it in part forms, and each outer rib of the bank having an inner portion that spans substantially upright from the trough part of the liner into the crest member of the outer rib that it in part forms, such that the obliquely spanning outer rib portions of the two outer ribs are on opposing outsides of the bank.

10. The liner of claim 9, wherein the substantially flat portion is a bottom for the liner in which:
the array of ribs in the first part goes from a front side of the liner bottom to an opposing rear side of the liner bottom, substantially to each respective boundary; and
as to the second part, the two arrays with the obliquely extending ribs form a mirror image of one another with respect to the array of the ribs in the first part in the central area.

11. The liner of claim 10, wherein the substantially flat portion further comprises at least one of:
a front wall of the liner that is attached to the liner bottom, which wall has an array of ribs arranged in a first part in a central area in an array extending along a front wall axis, and two arrays of ribs arranged in a second part extending obliquely with respect to the array of the first part and the front wall axis, and
a tailgate inside surface having an array of ribs arranged in a first part in a central area in an array extending along a tailgate axis, and two arrays of ribs arranged in a second part extending obliquely with respect to the array of the first part and the tailgate axis;
wherein:
the array of ribs in the first part of the at least one of the front wall and the tailgate inside surface extends to the boundary on a side adjacent the liner bottom so that these ribs of the at least one of the front wall and the tailgate inside surface line up with the array of ribs in the first part of the liner bottom; and
the two arrays of the second part of the at least one of the front wall and the tailgate inside surface form a mirror image of one another with respect to the array of the ribs in the first part in the central area of the at least one of the front wall and the tailgate inside surface.

12. The liner of claim 9, wherein the two outer ribs of the bank have at least one intervening rib between them, the at least one intervening rib having opposing rib portions that span substantially upright from the trough part of the liner into the crest member thereof.

13. The liner of claim 10, wherein the two outer ribs of the bank have at least one intervening rib between them, the at least one intervening rib having opposing rib portions that span substantially upright from the trough part of the liner into the crest member thereof.

14. The liner of claim 11, wherein the two outer ribs of the bank have at least one intervening rib between them, the at least one intervening rib having opposing rib portions that span substantially upright from the trough part of the liner into the crest member thereof.

15. In combination, a liner for a cargo bed of a vehicle and the bed of the vehicle to which the liner is attached, wherein:
the liner comprises a plastic vehicle bed liner with a member having a substantially flat portion with an outer boundary that defines sides and with ribs that consist essentially of three arrays per substantially flat portion, which arrays:
in a first part are arranged in a central area in an array extending along an axis, and
in a second part are arranged in two opposing arrays, each with the ribs extending obliquely with respect to the array of the first part and the axis, one of these two obliquely extending arrays on each side of the central area, with the ribs of the two obliquely extending arrays extending substantially to the outer boundary;
wherein at least some of the obliquely extending ribs are arrayed in a plurality of banks, each such bank having a plurality of ribs such that in cross section the bank of the obliquely extending includes two outer ribs, each outer rib of the bank having an outer portion that spans obliquely from a trough part of the liner into a crest member of the outer rib that it in part forms, and each outer rib of the bank having an inner portion that spans substantially upright from the trough part of the liner into the crest member of the outer rib that it in part forms, such that the obliquely spanning outer rib portions of the two outer ribs are on opposing outsides of the bank; and
the liner is immovably secured to the bed of the vehicle such that the liner does not substantially move in relation to the bed.

16. The combination of claim 15, wherein the substantially flat portion of the liner is a bottom for the liner in which:
the array of ribs in the first part goes from a front side of the liner bottom to an opposing rear side of the liner bottom, substantially to each respective boundary; and
as to the second part, the two arrays with the obliquely extending ribs form a mirror image of one another with respect to the array of the ribs in the first part in the central area.

17. The combination of claim 16, wherein the substantially flat portion of the liner further comprises at least one of:
a front wall of the liner that is attached to the liner bottom, which wall has an array of ribs arranged in a first part in a central area in an array extending along a front wall axis, and two arrays of ribs arranged in a second part extending obliquely with respect to the array of the first part and the front wall axis, and
a tailgate inside surface having an array of ribs arranged in a first part in a central area in an array extending along a tailgate axis, and two arrays of ribs arranged in a second part extending obliquely with respect to the array of the first part and the tailgate axis;
wherein:
the array of ribs in the first part of the at least one of the front wall and the tailgate inside surface extends to the boundary on a side adjacent the liner bottom so that these ribs of the at least one of the front wall and the tailgate inside surface line up with the array of ribs in the first part of the liner bottom; and
the two arrays of the second part of the at least one of the front wall and the tailgate inside surface form a mirror image of one another with respect to the array of the ribs in the first part in the central area of the at least one of the front wall and the tailgate inside surface.

18. The combination of claim 15, wherein the vehicle is a pickup truck.

19. The combination of claim 16, wherein the vehicle is a pickup truck.

20. The combination of claim 17, wherein the vehicle is a pickup truck.

* * * * *